(12) United States Patent
Urkude et al.

(10) Patent No.: US 8,417,907 B2
(45) Date of Patent: Apr. 9, 2013

(54) SYNCHRONIZING SNAPSHOT VOLUMES ACROSS HOSTS

(75) Inventors: Suhas Urkude, Sunnyvale, CA (US); Sasidharan Krishnan, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 356 days.

(21) Appl. No.: 12/608,892

(22) Filed: Oct. 29, 2009

(65) Prior Publication Data
US 2011/0107025 A1 May 5, 2011

(51) Int. Cl.
*G06F 12/00* (2006.01)

(52) U.S. Cl.
USPC .......................................... 711/162; 707/610

(58) Field of Classification Search .................. 711/162; 707/610
See application file for complete search history.

(56) References Cited

U.S. PATENT DOCUMENTS

| | | | |
|---|---|---|---|
| 6,014,669 A | 1/2000 | Slaughter et al. | |
| 7,149,858 B1 * | 12/2006 | Kiselev | 711/162 |
| 7,188,128 B1 | 3/2007 | Nagaraj et al. | |
| 7,194,487 B1 * | 3/2007 | Kekre et al. | 1/1 |
| 7,254,682 B1 | 8/2007 | Arbon | |
| 7,266,652 B1 | 9/2007 | Hotle et al. | |
| 7,373,520 B1 | 5/2008 | Borthakur et al. | |
| 7,565,419 B1 | 7/2009 | Kwiatkowski et al. | |
| 7,774,444 B1 | 8/2010 | George et al. | |
| 7,797,357 B1 | 9/2010 | Nagaraj et al. | |
| 7,886,119 B1 * | 2/2011 | Cameron et al. | 711/162 |
| 7,917,855 B1 | 3/2011 | Satish et al. | |
| 2006/0123211 A1 | 6/2006 | Derk et al. | |
| 2006/0206677 A1 | 9/2006 | Kim et al. | |
| 2007/0006018 A1 * | 1/2007 | Thompson et al. | 714/6 |
| 2007/0033356 A1 | 2/2007 | Erlikhman | |
| 2008/0104360 A1 | 5/2008 | Takeuchi et al. | |
| 2009/0187704 A1 | 7/2009 | Rodgers | |
| 2010/0030959 A1 * | 2/2010 | Satoyama et al. | 711/112 |

OTHER PUBLICATIONS

Symantec Corporation, "Veritas™ Volume Replicator Administrator's Guide, Solaris, 5.0 Maintenance Pack 3", 2008, Symantec Corporation, Cupertino, California, USA.
Symantec Corporation, "Veritas™ Volume Manager Administrator's Guide, Solaris, 5.0 Maintenance Pack 3", 2008, Symantec Corporation, Cupertino, California, USA.
Non-Final Office Action Mail Date May 8, 2012; U.S. Appl. No. 12/619,495.
Non-Final Office Action Mail Date Apr. 24, 2012; U.S. Appl. No. 12/827,911.
Non-Final Office Action Mail Date Mar. 28, 2012; U.S. Appl. No. 12/697,074.
Non-Final Office Action Mail Date Dec. 1, 2011; U.S. Appl. No. 12/700,664.
Final Office Action Mail Date Jun. 12, 2012; U.S. Appl. No. 12/700,664.

* cited by examiner

*Primary Examiner* — Hashem Farrokh
(74) *Attorney, Agent, or Firm* — Wilmer Cutler Pickering Hale and Dorr LLP

(57) ABSTRACT

Prior to overwriting a block of data in a first volume of data on a primary host, the block of data is written to a first snapshot of the first volume. Subsequently, the first snapshot can be synchronized with a snapshot of a second volume of data on a secondary host, where the second volume is a replica of the first volume. To synchronize the snapshots, only a portion of the first snapshot (e.g., the block of data that was written to the first snapshot) is sent to the secondary host.

19 Claims, 6 Drawing Sheets

SYNCHRONIZING SNAPSHOT VOLUMES ACROSS HOSTS

BACKGROUND

In virtual machine (e.g., virtual server) environments, a "golden image" is essentially a template that serves as the source of applications, databases, file systems, and other information with which virtual machines are provisioned. Virtual machines can be provisioned by cloning or replicating the golden image. For example, boot volumes for virtual machines can be provisioned by cloning the boot volume of the golden image.

In order to make each virtual machine ready for disaster recovery, the virtual disks of each virtual machine are replicated to remote sites over a wide area network (WAN). After they are created, the remote copies need to be periodically synchronized with the source copy—that is, after they are created, the remote copies need to be kept up-to-date if and when the source copy is modified.

Snapshots are also used to record and preserve the state of a storage device (e.g., a virtual disk) at any given moment. For disaster recovery, the snapshot volumes at the local and remote sites also need to be synchronized. However, standard synchronization mechanisms can be problematic when used for synchronizing snapshots. For example, if standard synchronization mechanisms are applied to snapshots, the copy of a virtual disk at the remote site may end up being larger than the corresponding source (local) version of the virtual disk. Also, synchronizing snapshots using standard synchronization mechanisms can take a relatively long time to complete and/or can consume a relatively large amount of network bandwidth.

SUMMARY

In one embodiment, prior to overwriting a block of data in a first volume of data on a primary host, the block of data is written to a first snapshot of the first volume. Subsequently, the first snapshot can be synchronized with a snapshot of a second volume of data on a secondary host, where the second volume is a replica of the first volume. To synchronize the snapshots, only a portion of the first snapshot (e.g., the block of data that was written to the first snapshot) is sent to the secondary host. Accordingly, snapshots can be efficiently synchronized across hosts.

In another embodiment, a first snapshot of a first volume of data is accessed. The first snapshot includes valid regions and invalid regions, where a region of the first snapshot is characterized as a valid region if the region includes data written from the first volume to the first snapshot, and otherwise the region is characterized as an invalid region. Subsequently, the first snapshot can be synchronized with a snapshot of a second volume of data on a secondary host, where the second volume is a replica of the first volume. To synchronize the snapshots, the valid regions but not the invalid regions are written to the second snapshot.

In yet another embodiment, a virtual disk includes a first volume of data stored in an array of physical disks on a primary host. A volume manager can: replicate the first volume of data to create a second volume of data on a secondary host; create a first snapshot of the first volume; write blocks of data to the first snapshot prior to overwriting those blocks of data with new data; and synchronize the first snapshot and a second snapshot of the second volume of data by sending only a portion of the first snapshot (e.g., the blocks of data that were written to the first snapshot) to the secondary host.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
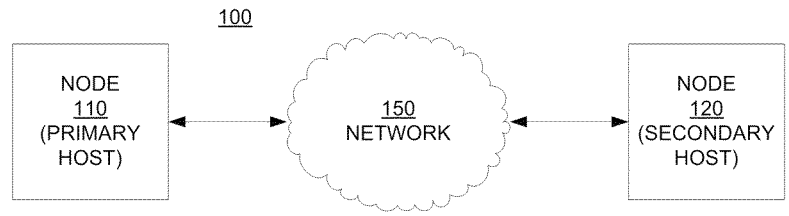
FIG. 1 is a block diagram depicting an example of a network architecture upon which embodiments according to the invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "writing," "overwriting," "synchronizing," "sending," "setting," "pointing," "replicating," "creating," "storing," "updating," "modifying," "producing," or the like, refer to actions and processes (e.g., flowchart 900 of FIG. 9) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram depicting a network architecture 100 in which nodes 110 and 120 are coupled to a network 150, which may be a WAN such as the Internet. Each of the nodes 110 and 120 can be implemented using computer system 210 of FIG. 2. The node 110 may be referred to as a source location, and the node 120 may be referred to as a remote location. The source node and remote node may also be referred to as a primary host and a secondary host, respectively. There may be multiple secondary hosts associated with each primary host.

The nodes 110 and 120 can communicate via the network 150 but otherwise are physically independent of one another. In other words, the two nodes are "single failure proof," such that a single failure or event would not be expected to disable both nodes, thus allowing the node 120 to serve as a backup for the node 110 (or vice versa). As will be seen by the discussion herein, a consistent copy of data on the source node 110 can be maintained at the remote node 120. The copy of the data at the remote location can be used for disaster recovery (DR) or for other purposes.

Figure 2:
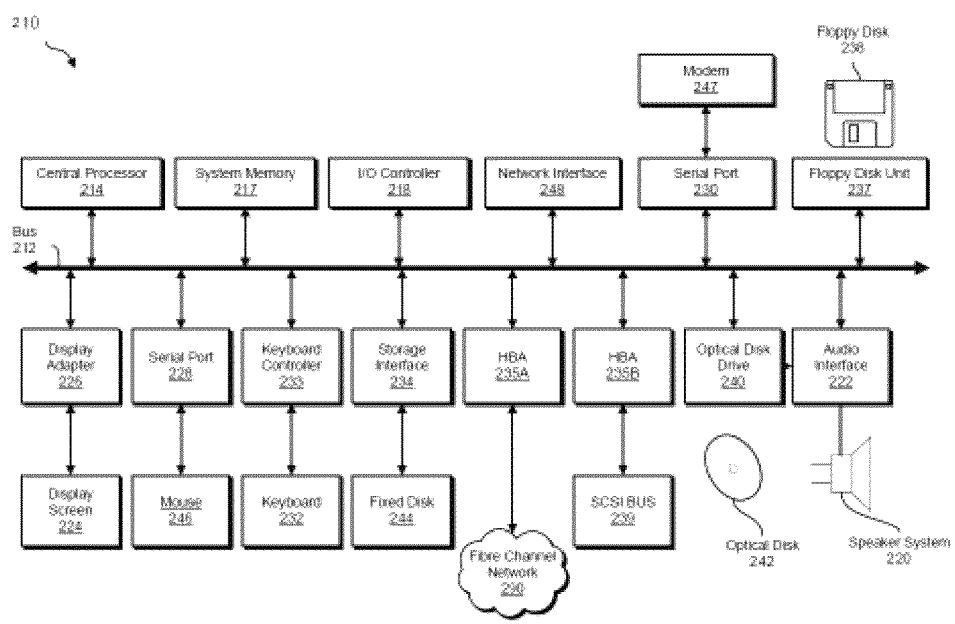
FIG. 2 is a block diagram depicting an example of a computer system upon which embodiments according to the invention can be implemented.

FIG. 2 depicts a block diagram of a computer system 210 suitable for implementing the present disclosure. The computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239; and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity from each of the nodes 110 and 120 to the network 150 of FIG. 1.

The bus 212 of FIG. 2 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. The computer-readable storage medium may be implemented as one or more virtual disks residing on an array of physical disks, as discussed in conjunction with FIG. 3. Applications can be in the form of electronic signals modulated in accordance with the application and data communication technology when accessed via network modem 247 or interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection or the like.

Many other devices or subsystems (not shown in FIG. 2) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2.

The operation of a computer system such as that shown in FIG. 2 is readily known in the art and is not discussed in detail in this application. Code to implement the present disclosure can be stored in computer-readable storage media such as one or more of the system memory 217, fixed disk 244, optical disk 242, or floppy disk 238. The operating system provided on the computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
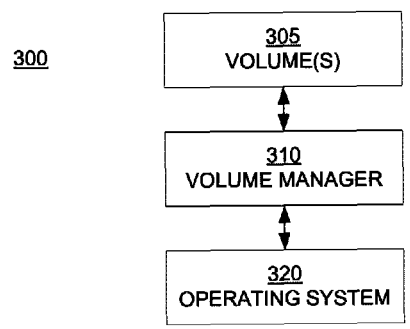
FIG. 3 is a block diagram depicting an embodiment of a volume management system.

FIG. 3 is a block diagram illustrating an embodiment of a volume management system 300. The system 300 can be implemented as computer-executable components residing on a computer-readable storage medium. For example, the system 300 can be implemented as part of a virtual machine that is implemented using the system 210 of FIG. 2.

With reference to FIG. 3, a volume manager 310 operates as a subsystem between an operating system 320 and one or more volumes 305 of data (blocks of data) that are stored in a data storage system (see FIG. 2 for examples). The data storage system may include physical storage devices such as an array of physical disks, LUNs (SCSI logical units), or other types of hardware that are used to store data. The volume manager 310 overcomes restrictions associated with the physical storage devices by providing a logical volume management layer that allows data to be spread across multiple physical disks within a disk array (not shown) in a manner that is transparent to the operating system 320, in order to distribute and/or balance input/output (I/O) operations across the physical disks. Each of the volumes 305 can retrieve data from one or more of the physical storage devices, and the volumes 305 are accessed by file systems, databases, and other applications in the same way that physical storage devices are accessed. The operation of the volume manager 310 in the manner just described is well known.

Figure 4:
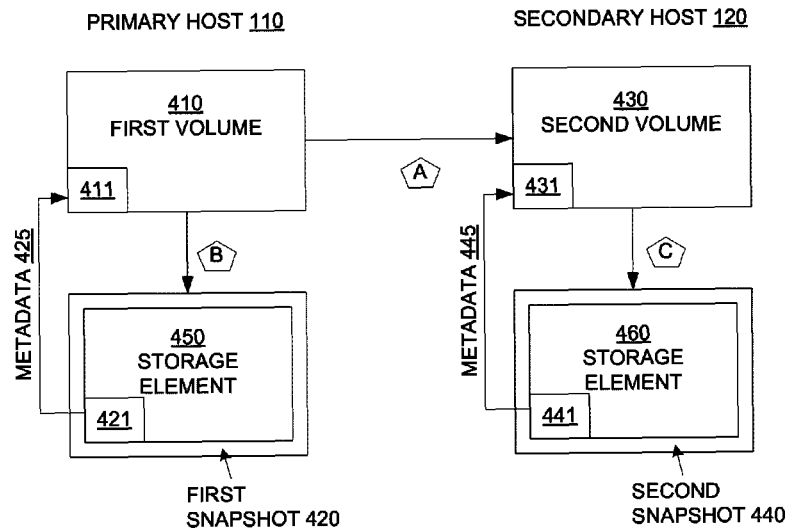
FIG. 4 is a block diagram depicting an example of a data replication process.

FIG. 4 is a block diagram illustrating an embodiment of a data replication process. The volumes and snapshots shown in FIG. 4 can be implemented as computer-executable components residing on a computer-readable storage medium (e.g., in system 210 of FIG. 2).

A first volume 410 of data resides on the primary host 110 (e.g., a first virtual machine) and includes one or more blocks of data including a block 411 (which may also be referred to herein as the first block of data). The volume 410 is analogous to the volume 305 of FIG. 3.

In one embodiment, the first volume 410 of FIG. 4 is a "boot volume" and includes operating system files and supporting files, although this disclosure is not so limited. The first volume 410 can represent a "golden image" (e.g., a template that serves as the source of applications, databases, file systems, and other information with which virtual machines can be provisioned).

In process A and at time T0, the first volume 410 is replicated on the secondary host 120 (e.g., a second virtual machine) to create a second volume 430 of data including a block 431 (which is a replica of the block 411). In this manner, a consistent copy of the first volume 410 is provided on a remote host for disaster recovery or for other purposes.

In process B, a snapshot 420 (also referred to herein as a first snapshot) of the first volume 410 is created. Process B may be performed before, after, or concurrently with process A; in general, process B is performed before new data is written to the first volume 410.

In process C, a snapshot 440 (also referred to herein as a second snapshot) of the second volume 430 is created on the secondary host 120. Thus, at the point in time in which the second volume 430 is replicated, the second snapshot 440 is a replica of the first snapshot 420. The snapshots 420 and 440 may also be known as volume snapshots.

In one embodiment, the snapshots 420 and 440 are copy-on-write (COW) snapshots; however, the snapshots may be any kind of snapshot, including snapshots that do not include copy-on-write. If the snapshots are COW snapshots, then write operations to the first volume 410 result in a COW operation (see the examples of FIGS. 5A and 5B).

In one embodiment, metadata or pointers 425 and 445 are included in, or associated with, the snapshots 420 and 440, respectively. For example, the first snapshot 420 includes a region 421 that corresponds to the block 411 of the first volume 410; at the time that the first snapshot 420 is created, the metadata 425 associated with the region 421 points to the block 411. At the time that the second snapshot 440 is created, the metadata 445 is a reflection of the metadata 425. That is, the metadata 445 is based on the metadata 425, except that the metadata 445 points to the second volume 430 (e.g., the metadata associated with the region 441 points to the block 431).

Continuing with reference to FIG. 4, in one embodiment, the first snapshot 420 includes or is associated with a backend storage element 450 that functions as a persistent store for the data resulting from writes to the original volume 410 or due to modifications to the first snapshot 420. In a similar manner, the second snapshot 440 includes or is associated with a backend storage element 460 that functions as a persistent store for the contents of the second snapshot 440. In the event of a write operation to the block 411, for example, the existing block of data is copied from the first volume 410 to the storage element 450 before new data is written to that block. The storage element 450 can be shared by multiple volumes in the same disk group.

In general, a block of data is copied from the first volume 410 to the first snapshot 420 (e.g., to the storage element 450) only if there is a write to that block of data. Thus, the data in the first volume 410 may change; however, the first snapshot 420 provides a stable and independent copy of the original data (where "original data" refers to the data in the volume 410 at time T0; original data may also be referred to herein as "valid data") that can be used for disaster recovery or for other purposes. The first snapshot 420 requires less storage space than the first volume 410 because the snapshot 420 stores only the data that has changed and otherwise merely contains a pointer to the first volume 410. As such, the first snapshot 420 may be referred to as a "space-optimized snapshot."

Figure 5A:
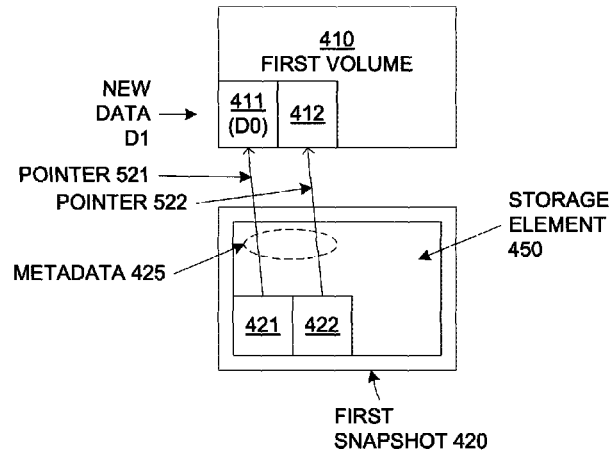
FIGS. 5A and 5B are block diagrams depicting an example of a write operation.
Figure 5B:
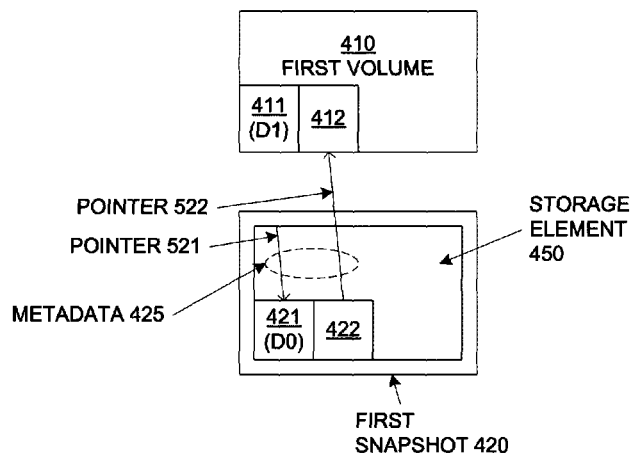

With reference now to FIGS. 5A and 5B, an example of a write operation is described. In the example of FIG. 5A, the first volume 410 includes a first block 411 of data D0 and a second block 412 of data. Initially (at time T0), the first snapshot 420 includes or is associated with metadata 425 that includes pointers 521 and 522 that point to the blocks 411 and 412, respectively, as previously described herein. At a point in time T1 after time T0, an attempt to write data D1 to the first block 411 is detected.

In the example of FIG. 5B, the data D0 in the first block 411 is copied to the first snapshot 420 (e.g., to the region 421 in the storage element 450) before the new data D1 is written to that block. After the original data D0 is copied to the first snapshot 420, the write can be committed and the new data D1 can be written to the first block 411. Thus, the first snapshot 420 contains the data D0 originally stored in the first block 411 and the metadata 425; the first block 411 in the first volume 410 stores the new data D1; and the second block 412 continues to store original data.

In general, at any point in time, original data will reside either entirely in the first volume 410 (if there have been no write operations), entirely in the first snapshot 420 (if every block in the first volume 410 has been written), or partially in the first volume 410 and partially in the first snapshot 420. However, the lifetime of the snapshot 420 is relatively short compared to the lifetime of the first volume 410—a new snapshot of the first volume 410 will likely be taken before every block in the first volume 410 has been written. Therefore, as pointed out above, the snapshot 420 generally will be smaller than the first volume 410.

Regions of the first snapshot 420 that correspond to blocks in the first volume 410 that have been written with new data may be characterized as "valid" regions in which valid (original) data resides, while the other regions of the snapshot 420 may be characterized as "invalid" regions. In other words, the first snapshot 420 can include valid regions and invalid regions, where valid regions are those regions in the snapshot for which valid data exists in the snapshot 420, while invalid regions in the snapshot are those for which the valid data exists in the first volume 410. In the example of FIG. 5B, the region 421 is characterized as a valid region, while the region 422 is characterized as an invalid region. In a snapshot, only the valid regions hold data, and therefore the first snapshot 420 is smaller than and will require less storage space than the first volume 410.

In general, the metadata 425 (e.g., the pointers) point to the valid data. For a particular region (e.g., region 422) of the first snapshot 420, if valid data resides in the first volume 410, then the pointer for that region points to the corresponding region (e.g., region 412) of the first volume. If valid data resides in a particular region (e.g., region 421) of the first snapshot 420, then the pointer essentially points to that region.

In one embodiment, the metadata 425 associated with the first snapshot 420 is updated after the original data D0 is copied to the first snapshot 420. As noted above, a purpose of the snapshot 420 is to restore the original data (the data that was present at time T0) to the first volume 410 for disaster recovery. At some point in time T(N) after time T0, some blocks of original data for the first volume 410 may still reside in the first volume 410 while other blocks of original data may reside in the first snapshot 420. At time T(N), the metadata 425 will still include pointers to those blocks of the first volume 410 that contain original (valid) data. Thus, for example, after the data D0 in the first block 411 is copied to the first snapshot 420, the metadata 425 can be updated so that the pointer 521 points to the block 421; the metadata 425 will still contain the pointer 522 that points to the block 412.

Figure 6:
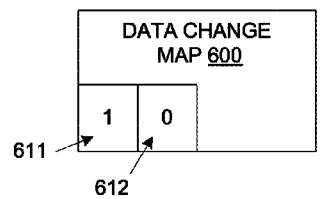
FIG. 6 is a block diagram that depicts an example of a data change map.

FIG. 6 is an example of a data change map 600 that can be used to track which regions of the first snapshot 420 (FIGS. 5A and 5B) are valid regions and which regions of the snapshot are invalid regions. The data change map 600 can reside in memory of the system 210 (FIG. 2) and can be maintained by the volume manager 310 (FIG. 3). In the example of FIG. 6, the data change map 600 is implemented as a bitmap; however, the data change map can be implemented in other ways. For example, the data change map 600 can be implemented as a series of bits that represent multiple states. In general, the data change map 600 can be implemented in any manner that describes whether a region is valid or invalid.

In the example of FIG. 6, each bit in the bitmap that is set (e.g., has a value of one) represents a valid region of the snapshot 420. In other words, each set bit represents a region of the first snapshot 420 (e.g., the storage element 450) that holds data that is different from the corresponding block in the first volume 410; each set bit represents a block or a region of blocks in the first volume 410 that has been written since the snapshot 420 was created. In the example of FIGS. 5B and 6, the bit 611 is set (e.g., it has a value of one) to indicate that the region 421 is a valid region, and the bit 612 is clear (e.g., it has a value of zero) to indicate that the region 422 is an invalid region.

The data change map 600 can be used to supplement or instead of the metadata 425 of FIGS. 5A and 5B. For example, instead of using pointers to point to the valid regions, the data change map 600 can be used to infer which regions are valid, and then data can be fetched on demand from the appropriate volume (that is, from either the first volume 410 or the first snapshot 420, whichever is appropriate).

Figure 7:
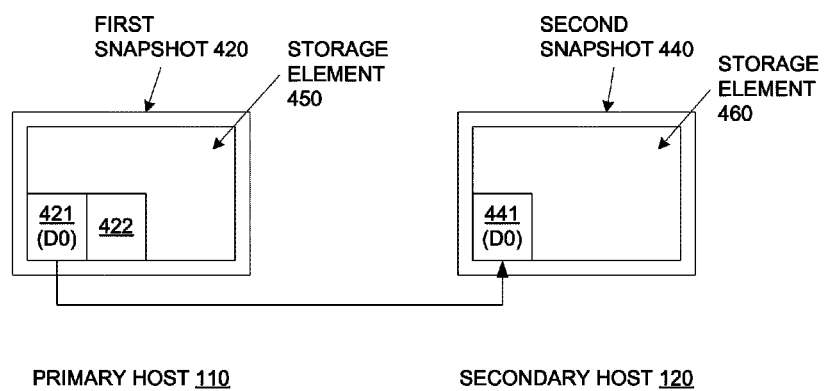
FIG. 7 is a block diagram that depicts synchronizing a first snapshot and a second snapshot.

With reference now to FIG. 7, the first snapshot 420 (on the primary host 110) and the second snapshot 440 (on the secondary host 120) are "synchronized" at a point in time T2 (after time T1). To synchronize the snapshots, only the valid regions of the first snapshot are copied to the second snapshot over the WAN 150 (FIG. 1). Because only the valid regions of the first snapshot 420 are sent/copied to the second snapshot 440, the two snapshots will be of the same size.

As noted previously herein with reference to FIG. 4, when the second volume 430 and the second snapshot 440 are created (at time T0), the metadata 445 associated with the second snapshot 440 is based on the metadata 425. When the first and second snapshots are updated at time T2, the metadata 445 can be updated as part of the snapshot synchronization process. Alternatively, the metadata 445 can be replaced with a copy of the updated metadata 425 sent from the primary host 110 along with the valid regions of the first snapshot 420; however, the copy of the metadata 425 is revised as needed so that the new metadata 445 will point to the second volume 430 and/or the second snapshot 440, as appropriate.

As discussed above, in one embodiment, the list of valid regions can be determined using the data change map 600 of FIG. 6. After the first snapshot 420 and second snapshot 440 are synchronized so that the second snapshot is a replica of the first snapshot, the data change map 600 can be initialized (e.g., set bits can be cleared).

The first volume 410 and the first snapshot 420 can be quiesced while the snapshots 420 and 440 are synchronized; that is, writes to the first volume 410 and the first snapshot 420 can be temporarily suspended while the snapshots are synchronized. Because the synchronization will occur relatively quickly, suspending writes to the first volume 410 is not expected to have a significant impact on performance.

However, the snapshots 420 and 440 can be synchronized without suspending writes to the first volume 410 using a process referred to herein as "replay." Using replay, the data change map 600 can be accessed again (after time T2) to identify any region of the first snapshot 420 that contains new data written to the snapshot 420 after time T2. As noted above, the data change map 600 is initialized after the first and second snapshots are synchronized. Thus, if the data change map 600 contains any values different from the initialized values (e.g., any set bits) when the data change map is accessed after time T2, that means that data has been copied to the first snapshot 420 since the synchronization at time T2. Consequently, the snapshot synchronization process may be repeated.

Figure 8A:
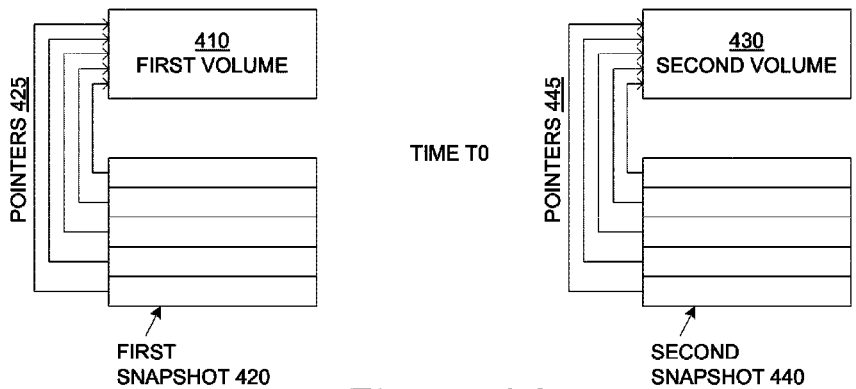
FIGS. 8A, 8B, and 8C depict an embodiment of a snapshot synchronization process.
Figure 8B:
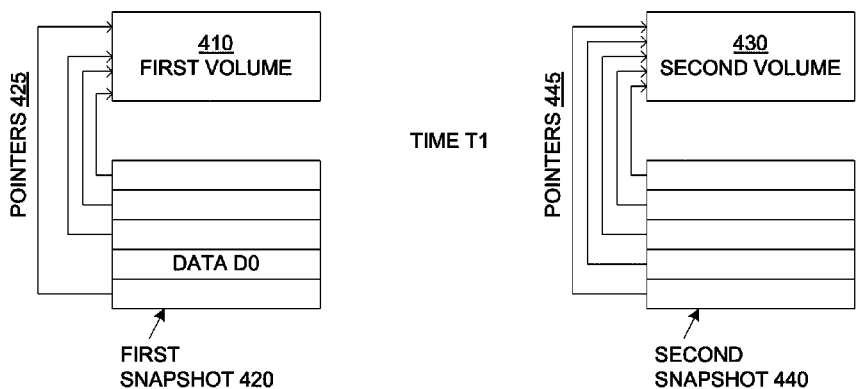
Figure 8C:
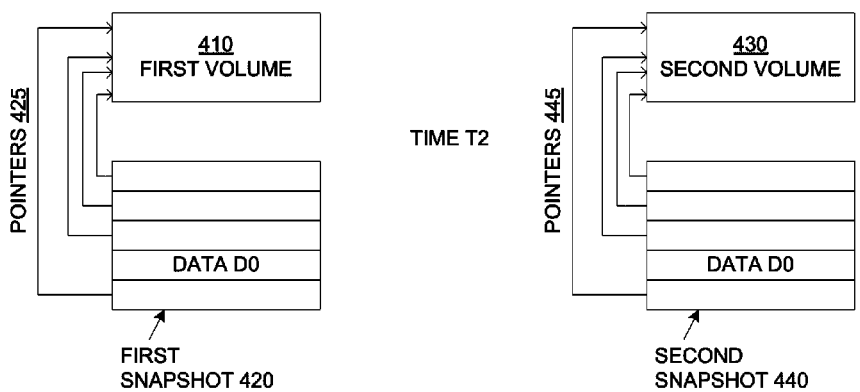

The discussion above is summarized in FIGS. 8A, 8B, and 8C, which depict an embodiment of a snapshot synchronization process. At time T0 (FIG. 8A), the first volume 410 is replicated to create the second volume 420. Also, a first snapshot 420 of the first volume 410 is created, and a second snapshot 440 of the second volume 420 is created. At this point, the first snapshot 420 only includes metadata (pointers) 425 that point to the first volume 410, and the second snapshot 440 only includes metadata (pointers) 445 that point to the second volume 430.

At time T1 (FIG. 8B), a write operation is detected, in which a block of data containing data D0 is targeted to be overwritten with new data. As described above in conjunction with FIGS. 5A and 5B, before the write operation is committed, the original data D0 is copied to the first snapshot 420. Also, the metadata 425 associated with the first snapshot 420 is updated (pointers that point to valid regions in the first snapshot are not shown).

At time T2 (FIG. 8C), the first and second snapshots are synchronized as described above in conjunction with FIG. 7. Thus, the second snapshot 440 also now includes the original block of data D0. Also, the metadata 445 associated with the second snapshot 440 is updated (pointers that point to valid regions in the second snapshot are not shown).

While the examples above are described in the context of a single block of data and a single synchronization, the present disclosure is not so limited. The examples above can be readily extended to scenarios in which multiple blocks of data are copied from the first volume 410 to the first snapshot 420 between times T1 and T2. Also, the examples above can be readily extended to scenarios in which the first and second snapshots are synchronized more than once. For example, at some time T3 after time T2, the first snapshot 420 may be further modified, and at some time T4 after time T3, the first and second snapshots may again be synchronized in the manner described herein. In general, any number of snapshots of the first volume can be synchronized with the snapshot on the secondary host.

Figure 9:
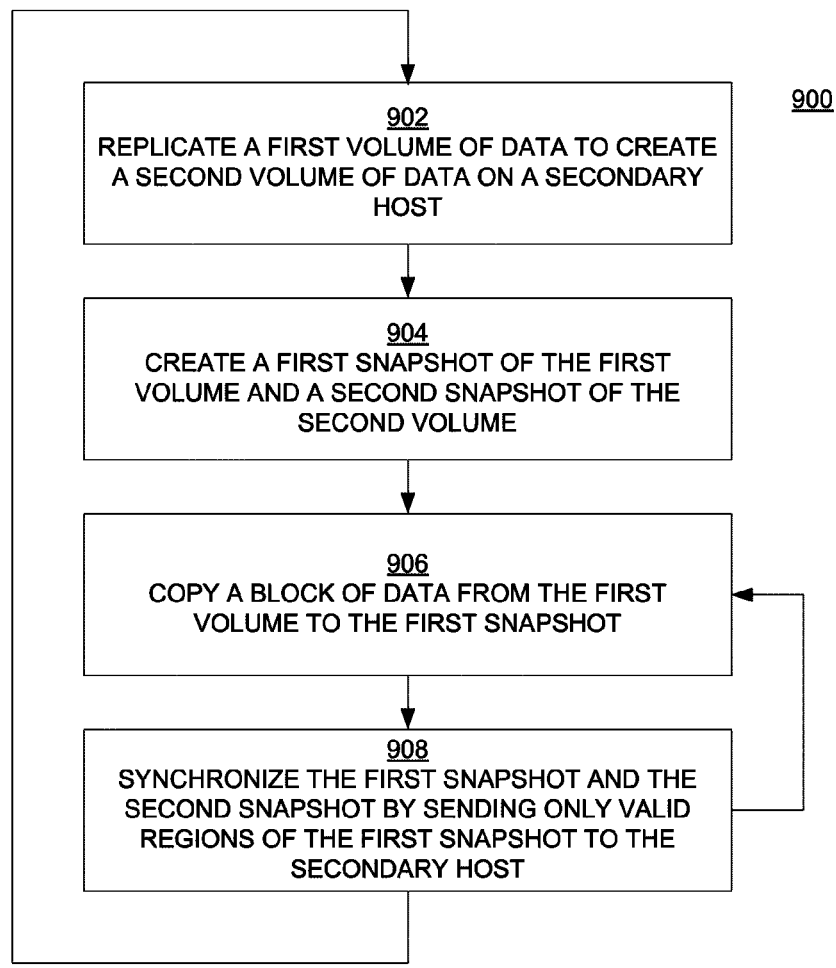
FIG. 9 is a flowchart depicting an embodiment of a computer-implemented method for managing data and synchronizing snapshots.

FIG. 9 is a flowchart 900 illustrating an embodiment of a computer-implemented method for managing data and synchronizing snapshots. Flowchart 900 can be implemented as computer-executable instructions residing on some form of computer-readable storage medium (e.g., in the system 210 of FIG. 2). For example, the method of flowchart 900 can be implemented by the volume manager 310 of FIG. 3. FIG. 9 is described in conjunction with FIG. 4 unless otherwise noted.

In block 902, a first volume of data 410 on a primary host 110 is replicated to create a second volume of data 430 on a secondary host 120. The first volume 410 can be, but is not limited to, a virtual disk, boot volume, or golden image, and is not restricted to a single physical disk.

In block 904, a first snapshot 420 (e.g., a COW snapshot) of the first volume 410 is created. The snapshot 420 includes, or is associated with, metadata 425 that points to blocks of data in the first volume 410.

In block 906, before a block of data (e.g., block 411) is overwritten, the block 411 is written (copied) to the first snapshot 420. In one embodiment, the block 411 is written to a storage element 450. In one embodiment, a data change map 600 (FIG. 6) is updated to indicate that a region of the snapshot 420 corresponding to the block 411 (e.g., the region 421 of FIG. 5B) has been written with the data from that block. That is, the data change map 600 is updated to indicate that the region 421 is a valid region. Also, the metadata 425 associated with the first snapshot 420 can be updated.

The operations associated with block 906 may be repeated before the next step in the flowchart 900 (block 908) is performed. In other words, more than one block of data in the first volume 410 may be copied to the first snapshot 420 before the first snapshot is synchronized with the second snapshot 440.

In block 908 of FIG. 9, with reference also to FIGS. 5A and 5B, the first snapshot 420 (as modified in block 906) and the second snapshot 440 are synchronized by sending only a portion of the snapshot 420 (e.g., only the block 411 that was written to the first snapshot) to the secondary host 120. More specifically, only the valid regions, and not the invalid regions, of the first snapshot 420 are sent to the secondary host 120 and written to the second snapshot 440.

When the first and second snapshots are synchronized, the metadata 445 for the second volume 430 can be updated as part of the snapshot synchronization process. Alternatively, the metadata 445 can be replaced with a copy of the updated metadata 425 associated with the first volume 410; however, the copy of the metadata 425 is revised as needed so that the new metadata 445 will point to the second volume 430.

Consequently, the copy of the virtual disk at the remote site (e.g., the second volume 430 and second snapshot 440 on the secondary host 120) is not larger than the corresponding original version of the virtual disk (e.g., the first volume 410 and first snapshot 420 on the primary host 110). Also, the process of synchronizing snapshots can be accomplished more quickly and using less bandwidth than conventional techniques.

The operations associated with block 908 may be repeated. In other words, the first snapshot 420 may be synchronized with the second snapshot 440 at some time T(M); at time T(M+1), the first snapshot may be modified as described in conjunction with block 906; at time T(M+2), the first and second snapshots may again be synchronized; and so on.

Furthermore, after the first and second snapshots are synchronized at some point in time, an entirely new snapshot of the current state of the volume 410 of data residing on the primary host at that point in time can be created. In other words, the flowchart 900 can return to block 902, and the operations associated with the flowchart 900 can be repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer-readable storage medium having computer-executable instructions for causing a computer system to perform a method of synchronizing snapshots, said method comprising:

accessing a first volume of data on a primary host, said first volume comprising a plurality of blocks of data including a first block of data;

accessing a first snapshot of said first volume, said first snapshot comprising first metadata that points to blocks of data in said first volume that are unchanged since creation of said first snapshot, wherein said first metadata is included in said first snapshot instead of including in said first snapshot copies of said blocks of data that are unchanged since said creation of said first snapshot, said first snapshot comprising only copies of blocks of data that have been overwritten in said first volume since said creation of said first snapshot;

prior to overwriting said first block of data in said first volume with changed data, writing said first block of data from said first volume to said first snapshot to produce a modified first snapshot; and synchronizing said modified first snapshot and a second snapshot of a second volume of data on a secondary host to produce a modified second snapshot, wherein said second volume comprises a replica of said first volume, said synchronizing comprising copying only a first portion of said modified first snapshot from said first snapshot to said second snapshot, said first portion comprising said first block of data.

2. The computer-readable storage medium of claim 1 wherein said first snapshot comprises a copy-on-write snapshot.

3. The computer-readable storage medium of claim 1 wherein said method further comprises accessing a data change map to identify a region of said modified first snapshot that comprises said first block of data.

4. The computer-readable storage medium of claim 1 wherein said first volume comprises a virtual disk and is not restricted to a single physical disk.

5. The computer-readable storage medium of claim 1 wherein said primary and secondary hosts reside on different nodes of a wide area network.

6. The computer-readable storage medium of claim 1 wherein said method further comprises:

writing a second block of data from said first volume to said modified first snapshot to produce a different modified first snapshot; and synchronizing said different modified first snapshot and said modified second snapshot by sending only a second portion of said different modified first snapshot to said secondary host, said second portion comprising said second block of data.

7. The computer-readable storage medium of claim 1 wherein said method further comprises:

replicating said first volume of data to create said second volume of data; and creating said first snapshot of said first volume.

8. A computer system comprising:

a processor; and memory coupled to said processor and having stored therein instructions that, if executed by said computer system, cause said computer system to execute a method of synchronizing snapshots, said method comprising:

accessing a first snapshot of a first volume of data, said first snapshot comprising a plurality of regions comprising valid regions and invalid regions, wherein said invalid regions comprise metadata that point to blocks of data in said first volume that are unchanged since creation of said first snapshot, wherein said metadata is included in said first snapshot instead of including in said first snapshot copies of said blocks of data that are unchanged since said creation of said first snapshot, and wherein said valid regions comprise copies of blocks of data that have been overwritten in said first volume since said creation of said first snapshot; and synchronizing said first snapshot and a second snapshot of a second volume of data, wherein said second volume comprises a replica of said first volume, said synchronizing comprising writing said valid regions but not said invalid regions from said first snapshot to said second snapshot.

9. The computer system of claim 8 wherein said method further comprises updating a data change map to indicate which of said regions are valid regions.

10. The computer system of claim 8 wherein said first volume of data comprises a virtual disk and is not restricted to a single physical disk.

11. The computer system of claim 8 wherein said method further comprises modifying said first snapshot subsequent to said synchronizing to produce a modified first snapshot, wherein said modified first snapshot and said second snapshot are again synchronized.

12. The computer system of claim 8 wherein said method further comprises:

replicating said first volume of data to create said second volume of data; and creating said first snapshot of said first volume.

13. A computer-readable storage medium having computer-executable components for managing data on a primary host device, said components comprising:

a virtual disk comprising a first volume of data stored in an array of physical disks, said first volume comprising a plurality of blocks of data; and a volume manager coupled to said virtual disk, said volume manager operable for:

replicating said first volume of data to create a second volume of data on a secondary host;

creating a first snapshot of said first volume, said first snapshot comprising metadata that points to blocks of data in said first volume that are unchanged since creation of said first snapshot, wherein said metadata is included in said first snapshot instead of including in said first snapshot said blocks of data that are unchanged since said creation of said first snapshot, said first snapshot comprising only blocks of data that have been overwritten in said first volume since said creation of said first snapshot;

writing a subset of said blocks of data in said first volume to said first snapshot prior to overwriting said subset of blocks in said first volume with new data to produce a modified first snapshot; and synchronizing said modified first snapshot and a second snapshot of said second volume of data by sending only a portion of said modified first snapshot from said first snapshot to said second snapshot, said portion comprising said subset of blocks.

14. The computer-readable storage medium of claim 13 wherein said volume manager is further operable for updating a data change map to indicate regions of said modified first snapshot comprising said subset of blocks.

15. The computer-readable storage medium of claim 13 wherein said virtual disk is not restricted to a single physical disk.

16. The computer-readable storage medium of claim 13 wherein said primary and secondary hosts reside on different nodes of a wide area network.

17. The computer-readable storage medium of claim 13 wherein said modified first snapshot is modified again subsequent to said synchronizing to produce a different modified first snapshot, wherein said different modified first snapshot and said second snapshot are again synchronized.

18. The computer-readable storage medium of claim 1 wherein said second snapshot comprises second metadata that points to blocks of data in said second volume that are unchanged since creation of said second snapshot, wherein said second metadata is included in said second snapshot instead of including in said second snapshot said blocks of data that are unchanged since said creation of said second snapshot, said second snapshot comprising only blocks of data that have been overwritten in said second volume since said creation of said second snapshot, wherein said synchronizing comprises updating said second metadata.

19. The computer-readable storage medium of claim 1 wherein said second snapshot comprises second metadata that points to blocks of data in said second volume that are unchanged since creation of said second snapshot, wherein said second metadata is included in said second snapshot instead of including in said second snapshot said blocks of data that are unchanged since said creation of said second snapshot, said second snapshot comprising only blocks of data that have been overwritten in said second volume since said creation of said second snapshot, wherein said synchronizing comprises:
  replacing said second metadata with said first metadata to produce copied first metadata; and
  revising said copied first metadata so that said copied first metadata points to said second volume.

* * * * *